Oct. 3, 1972  S. RONTSCH  3,695,953
METHOD FOR THE PRODUCTION OF EXPLOSIVES
Filed March 9, 1970
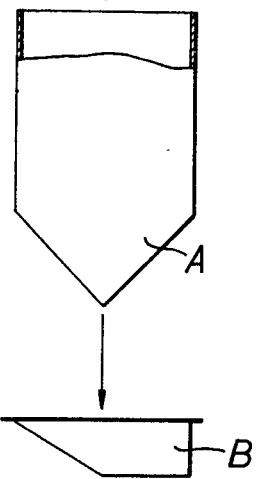
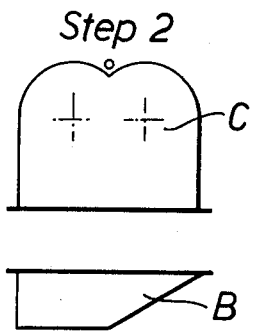
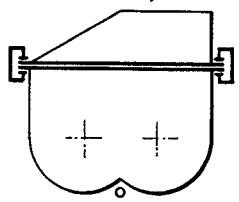
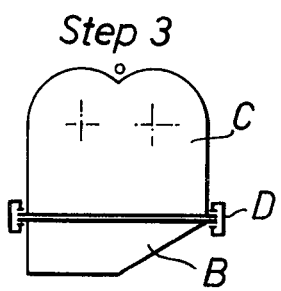
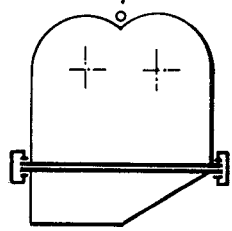
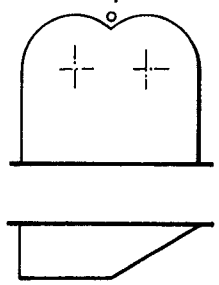
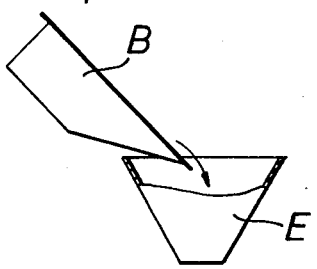
SIGFRID RONTSCH
INVENTOR
BY *Nolte & Nolte*
ATTORNEY

United States Patent Office 3,695,953
Patented Oct. 3, 1972

3,695,953
METHOD FOR THE PRODUCTION OF EXPLOSIVES
Sigfrid Rontsch, Schonebeck (Elbe), Germany, assignor to VEB Sprengstoffwerk Schonebock
Filed Mar. 9, 1970, Ser. No. 17,835
Int. Cl. C06b 1/04
U.S. Cl. 149—56         4 Claims

ABSTRACT OF THE DISCLOSURE

Components of an explosive composition are mixed to form the explosive composition by charging the components into a first container having an open side facing upwards, sealing a second container over the first container, the second container being provided with mixing means, rotating the resultant assembly about 180° whereby the containers are inverted relative to each other and the contents of the first container fall into the second container, mixing the components together in the second container by operation of the mixing means, rotating the assembly again about 180° whereby the first container again assumes the bottom position and the mixed explosive composition falls from the second container into the first container, disassembling the first container from the second container and transporting the first container away from the second container.

---

This invention relates to a method for the production of explosive which method is characterized by considerable technical and economic advantages as well as a significant increase in safety.

The known methods of producing explosive fall into two basic types.

In one type, which is characterized by the use of a stationary explosives mixing machine, the individual prepared components of the explosive are transported to and fed into the mixing zone defined by the mixing machine, mixed therein and finally transported to further processing steps.

The second type of method is characterized by the presence of an explosives mixing machine having a movable mixing container. The mixing container is charged with the individual prepared components of the explosive and transported to the mixing means. After the expiration of the necessary mixing time the mixing means is taken out of the explosive and the explosive is transported away in the mixing container to the further processing steps.

Both types of methods possess considerable technical, economical and safety deficiencies.

Thus, in the type of method characterized by the use of a stationary mixing machine, a very great expense is necessary in order to charge the mixing machine with the components of the explosive. Specifically, conveyor belts, feed hoppers or elevators are necessary for the charging. These transporting means are always contaminated with explosives and in the event of initiation produce an explosive chain. Accordingly, the charging apparatus must meet the same safety margin as the mixing zone with respect to having extreme strength. The conceivable variant involving transporting means defining the mixing zone and through feeding apparatus feeding to the mixing machine the components of the explosive down a natural incline is in most European countries forbidden by legal provisions. Also, these variants are contrary to the principle of providing clean transporting paths in the production of explosives.

The second type of method, which is characterized by the use of movable mixing containers, indeed eliminates one disadvantage of the type of methods employing stationary mixing machines for the explosive components. By the use of the mixing container as the transporting container there results, however, other disadvantages. Thus, the use of the mixing container as a component of the mixing machine restricts the shape and dimensions of the container. There thus results a shape and dimensions which are not particularly suitable for use in transporting. Moreover, since the container must be used for subsequent mixing it cannot be filled to full capacity for transporting for this would interfere with the mixing. A relatively large free space must be left in the container for insertion of the mixing means and to permit thorough mixing. Moreover, in the case of the production of certain types of gelatinous explosives it is necessary that the container be provided with heating or cooling means. In these cases usually a double mantle mixing container is used. There thus results further disadvantages, especially a significant increase in weight and a difficult preheating. As long as the mixing container is employed as a transporting container, it is not possible to carry this out without considerable expense. Specifically, a consequence is a longer mixing time since to the otherwise necessary mixing time there must be added the preheating time. Moreover, to provide for the event of the mixing container being damaged during transporting it is conventional to keep on hand a supply of substitute mixing containers. These substitute mixing containers are very expensive. The further use of mixing containers which have become deformed by use in transporting is generally not possible since the mixing effect is influenced by the shape of the mixing container.

It is an object of this invention to provide a method of producing explosives involving relatively little expense and a considerable increase in safety.

According to the invention, there is provided a method in which a stationary explosives mixing machine without special charging apparatus is charged in compliance with the principle of providing clean transporting paths and the prepared explosive is further processed under like conditions.

More specifically, according to the invention there is provided a stationary explosives mixing machine which is pivotable by at least 180° and has a covering container which is utilizable as a transporting vessel, a feeding vessel and an emptying vessel. The covering container, which contains the components of the explosive, in the feeding position (which corresponds to the subsequent emptying position) is fastened to the mixing machine is pivotally overturned and together with the mixing machine. There results feeding into the mixing container of the components to be mixed and the components can then be worked up by the mixing means. The emptying of the mixing machine is carried out by swinging the apparatus back to the emptying position (which corresponds to the former feeding position) whereby the prepared explosive falls back into the covering container and is ready to be transported away therein.

The invention will now be further described by reference to an operating example in conjunction with the drawing. The drawing is a flow sheet of the method of the invention. The components of the explosive preferably constitute by weight, 79.5% ammonium nitrate, 4.0% nitroglycol, 13.0% trinitrotoluol (TNT), 1.0% dinitrotoluol, 2.0% sawdust, and 0.5% colcothar. They are fed from the hopper A to the covering container B (Step 1) and the covering container B is transported to the mixing machine C (Step 2). The mixing machine C, which is in the feeding position, is fastened to the covering container B in an airtight manner by means of a suitable seal D (Step 3) and the resultant assembly is pivoted about 180° to the mixing position and mixing is carried out (Step 4).

The assembly then is pivotably turned back about 180° to its emptying position in which the mixed explosive falls into the covering container B (Step 5). The covering container B is then disassembled from the mixing machine C (Step 6) and transported to means E for further processing the explosive into which the explosive is emptied (Step 7).

What is claimed is:

1. A method for the production of an explosive, comprising the steps of charging a plurality of components, including ammonium nitrate, trinitrotoluol, and a component selected from the group of dinitrotoluol and nitroglycol, into a first container having an open side facing upwards; sealing over the open side of the first container, an open side of a second container provided with mixing means; overturning the resultant assembly to place the first container above the second container and to let the charged components fall from the first container into the second container; mixing the components in the second container while the two containers are still sealed together; then turning the assembly back so that the first container is again below the second container, and thereby letting the mixed components fall from the second container into the first container; disassembling the first container from the second container; and transporting the first container away from the second container.

2. A method according to claim 2, wherein said components also include sawdust and colcothar.

3. A method according to claim 3 wherein said components include by weight 79.5% ammonium nitrate and 13.0% trinitrotoluol.

4. A method according to claim 1 wherein said components approximately fill the first container but leave a relatively large space in the second container.

References Cited

UNITED STATES PATENTS 3,562,364    2/1971    Caudle et al. _____ 149—109

CARL D. QUARFORTH, Primary Examiner

S. J. LECHERT, Jr., Assistant Examiner

U.S. Cl. X.R.

149—57, 106